United States Patent [19]

Weymouth, Jr.

[11] Patent Number: 5,440,798
[45] Date of Patent: Aug. 15, 1995

[54] METHOD OF MAKING CONCAVE ASPHERIC BIFOCAL MOLD COMPONENT

[75] Inventor: Russell F. Weymouth, Jr., Charlton Depot, Mass.

[73] Assignee: Gentex Optics, Inc., Carbondale, Pa.

[21] Appl. No.: 182,937

[22] Filed: Jan. 18, 1994

[51] Int. Cl.⁶ .................................................. B21B 1/46
[52] U.S. Cl. ................................. 29/527.6; 29/527.1; 29/527.3; 264/220; 264/225; 264/226
[58] Field of Search .................. 29/527.6, 527.1, 527.3; 264/220, 225, 226, 227, 1

[56] References Cited

U.S. PATENT DOCUMENTS

| | | | |
|---|---|---|---|
| 3,109,696 | 11/1963 | Whitney | 18/435 |
| 3,428,533 | 2/1969 | Pichel | 204/7 |
| 3,555,126 | 1/1971 | Gitson | 264/1 |
| 3,649,236 | 3/1972 | Rosenbauer | 65/31 |
| 4,116,753 | 9/1978 | Tojyo et al. | 156/624 |
| 4,614,624 | 9/1986 | Neefe | 264/2.5 |
| 4,659,524 | 4/1987 | Neefe | 264/2.5 |

FOREIGN PATENT DOCUMENTS

1-271130  10/1989  Japan .

OTHER PUBLICATIONS

Proceedings of SPIE, Intr Soc Optical Eng'r vol. 655 pp. 293–299 (1986) by Leonard E. Chaloux.

*Primary Examiner*—Carl J. Arbes
*Attorney, Agent, or Firm*—Shenier & O'Connor

[57] ABSTRACT

A method of making a concave aspheric mold insert by electroplating nickel over a silver release agent coating on an aspheric surface formed in a copper substrate to form a master having a convex surface which is a negative image of the aspheric surface. After the master has been separated from the substrate its convex surface is coated with a silver release agent and electroplated with nickel to form an element having a concave surface which is a replication of the aspheric surface and the opposite surface of which is convex. After the convex surface of the element has been trued to spherical shape, a slightly oversize spherical D-seg is formed in the aspheric surface. The aspheric surface is then trued to reduce the D-seg to final size to produce the insert. A number of elements are formed from the master and are provided with D-segs of different radii. In an alternative method the D-seg is formed in the spherical concave surface of a glass substrate, the spherical concave surface of which has the best fit to the desired aspheric surface.

17 Claims, 5 Drawing Sheets

METHOD OF MAKING CONCAVE ASPHERIC BIFOCAL MOLD COMPONENT

FIELD OF THE INVENTION

The invention is in the field of molding plastic lenses and more particularly relates to a method of making a concave aspheric mold component.

BACKGROUND OF THE INVENTION

In recent years plastic has replaced glass as a preferred material for the formation of spectacle lenses. Plastic lenses are lighter, are tintable, and in the case of polycarbonate for example, possess the ability to absorb impact without fracturing. Higher index plastics permit the formation of thinner, lighter lenses and yet generally maintain a convex sphere as the choice for the front surface.

Apparatus of the prior art for injection molding ophthalmic lenses from a suitable plastic such as polycarbonate resin, for example, employs a concave insert used as a negative to produce finished convex surfaces of the lenses made on the apparatus. With the advent of rigid polishing equipment, purer slurries and better accuracy on the preform, fabrication of spherical mold inserts has been simplified. These inserts or "tools" may be fabricated from glass, stainless steel, germanium, aluminum and various other materials.

Convex inserts may be fabricated in a similar manner to produce the concave surface of the finished lens.

Multi-focal molded lenses generally have the reading or "near" surface power on the convex surface of the lens. Mold inserts for forming the required convex surface are made in various ways from glass, metal or some other suitable substrate.

The ability to fuse glass makes it perhaps the easiest to use in the formation of a spherical segmented multifocal mold insert. In making the concave bifocal mold component, a glass concave blank is prepared with ground and polished concave and convex surfaces. Next, a second spherical radius is countersunk into the existing distance radius of the concave surface of the blank. This second radius is the final reading radius of the mold component. Then a glass "button", having a convex radius matching the concave countersink, is placed in proper orientation and the assembly is then fused in a kiln making the two components one. After fusing, the distance spherical radius is once again regenerated and polished to bring the "add" portion down to the proper dimension.

In the manufacture of concave mold inserts, it has also been suggested that a spherical concave surface of one radius might be generated on a second previously existing concave radius.

"D-Seg" multi-focal lenses and "Executive" multi-focal lenses in which the near vision portion extends completely across the lower portion of the lens, may be made from a one-piece glass or metal component by another technique which requires no fusing and which allows placement of the reading portion directly into the concave surface of the component or insert. Since the surface to be produced is not symmetrical, these inserts require special stock removal and polishing techniques. Creation of a small circular multi-focal segment into a larger concave sphere of another radius, as described earlier, is relatively simple because the segment is round and spherical or symmetrical. However, a "D-Seg" or "Executive", not being symmetrical, does not allow for rotation of any secondary finishing devices such as a round convex spherical lap or disc generator. Special toric polishing equipment is necessary to fabricate inserts of this type. Electrical Discharge Machines (EDM's) using a graphite electrode allow for rapid stock removal from a conductive substrate to facilitate formation of the second concave radius providing the reading section onto the first concave radius providing the distance section. Platings are applied before final finishing to ensure a finely polished surface with minimal optical distortion.

In all instances the reading concave radius is generated into the larger distance concave radius to a dimension somewhat larger than the final dimension. This is done in order to permit the reading portion to be protected by some type of covering and then the distance concave spherical radius be reworked to reduce the size of the reading portion to within a specific tolerance. Owing to the fact that the distance portion is spherical and symmetrical, this may be easily accomplished with a number of techniques.

Owing to their cosmetic appeal, plastic progressive multi-focal lenses have come into wide use. Progressive multi-focal surfaces are non-symmetrical and the concave mold inserts used to manufacture these lenses require special fabrication techniques. In one such technique a ceramic block first is cut to a predetermined concave geometry. Next, a symmetrical glass blank, also of a specific geometry, is then placed on the ceramic block and the assembly is put into a kiln. The temperature within the kiln is raised and lowered to a specific temperature cycle to slump the glass so that the back or convex surface of the glass blank comes into contact with the concave surface of the ceramic. In the course of the temperature cycle, a form of the image of the ceramic blank is transferred through the glass blank onto the concave surface thereof. This is the conventional technique for producing glass concave progressive mold inserts.

The quest for lenses which are even thinner and lighter resulted in the development of aspheric finished and semi-finished lenses. Such lenses are manufactured using concave molding components or inserts which are rotationally symmetrical and yet not spherical. Since spherical polishing equipment cannot be used to form these inserts, they are slumped as is done to produce the progressive multi-focal mold components or they are polished by computer-aided polishing equipment using special programs. A third method of generating the aspheric concave surface is through single point diamond turning. Usually, a high quality stainless steel is chosen as the substrate and, after machining, the concave surface is plated with approximately 0.007" of nickel and then retrued using a single point diamond turning center. After turning the concave surface need only be hand polished with fine grain diamond compound.

It will readily be appreciated that in the casting injection or injection/compression molding process, the original concave mold component used to produce the convex portion of the finished lens is used over and over again. The durability of the insert permitted successful image transfer over only a limited number of cycles. Nickel replication, which is a system of making duplicate copies of an original mold component, permits many copies to be made from a master insert. These copies can then be used as concave mold components or inserts to produce convex lens surfaces.

The advent of aspheric base curves placed on the convex surface of finished ophthalmic lenses, has given rise to a demand for a new style multi-focal. While the new multi-focal is quite similar to the "D-seg" shaped multi-focal discussed hereinabove, a critical difference is that the new style "D-seg" has an aspheric distance portion and a spherical reading portion whereas the distance and reading portions of the original multi-focal both were spherical.

It will be remembered that fabrication of the original multi-focal discussed hereinabove used spherical and toric polishing equipment on the concave distance and reading portion spheres.

Concave aspheric multi-focal inserts cannot be manufactured using any of the techniques discussed hereinabove. One possible method which was considered is a variation of the method of forming a spherical multi-focal concave mold insert. In this method the concave aspheric distance portion first is accurately roughed into the face of the stainless steel mold component. The component is then heat treated. Next, it is set up in the Electrical Discharge Machine with a graphite electrode having the appropriate spherical convex form located above the component and normal to the reading portion optical position on the aspheric surface. The "D-seg"-shaped reading portion is then formed in the concave aspherical surface. The "D-seg" is then roughed and polished on the toric polisher to a predetermined size. Then cast iron laps, polishing pads, and various grades of alumina oxide and diamond are used to prepare the "D-seg" for plating. The entire aspheric concave surface then is plated with approximately 0.007" of nickel by an electroless plating process. The "D-seg" is then ground and polished to a predetermined size which is slightly larger than the final size. The insert is then mounted in the single point diamond lathe and the aspheric surface is generated. As the nickel plating is removed in the course of this operation, the "D-seg" is reduced in overall size. When the "D-seg" is of the proper size, the machining operation is complete. The aspheric surface may then be hand polished.

While the technique just described is possible, it is so expensive as to be prohibitive. In a typical matrix, eighteen mold inserts are required to cover each base curve. Many base curves are employed to cover a range of prescriptions.

In addition to the necessity for producing a multiplicity of inserts, the success rate for the completion of each mold insert also is low. While the electroless plating is rapid and produces a uniform deposit, it often has pits. Further, breaking through the nickel surface for damage occurring during any of the various steps of the fabrication process, could result in failure.

SUMMARY OF THE INVENTION

One object of my invention is to provide a method of making a concave aspheric segmented bifocal mold insert for use in the manufacture of ophthalmic prescription spectacle lenses.

Another object of my invention is to provide a method of manufacturing a concave aspheric segmented bifocal mold insert which is cost effective.

Another object of my invention is to provide a method of making an aspheric segmented multi-focal concave mold insert having a high success rate.

Other and further objects of my invention will appear from the following description.

BRIEF DESCRIPTION OF THE DRAWINGS

In the accompanying drawings to which reference is made in the instant specification and which are to be read in conjunction therewith and in which like reference numerals are used to indicate like marks in the various views.

DESCRIPTION OF THE PREFERRED EMBODIMENT

Figure 1:
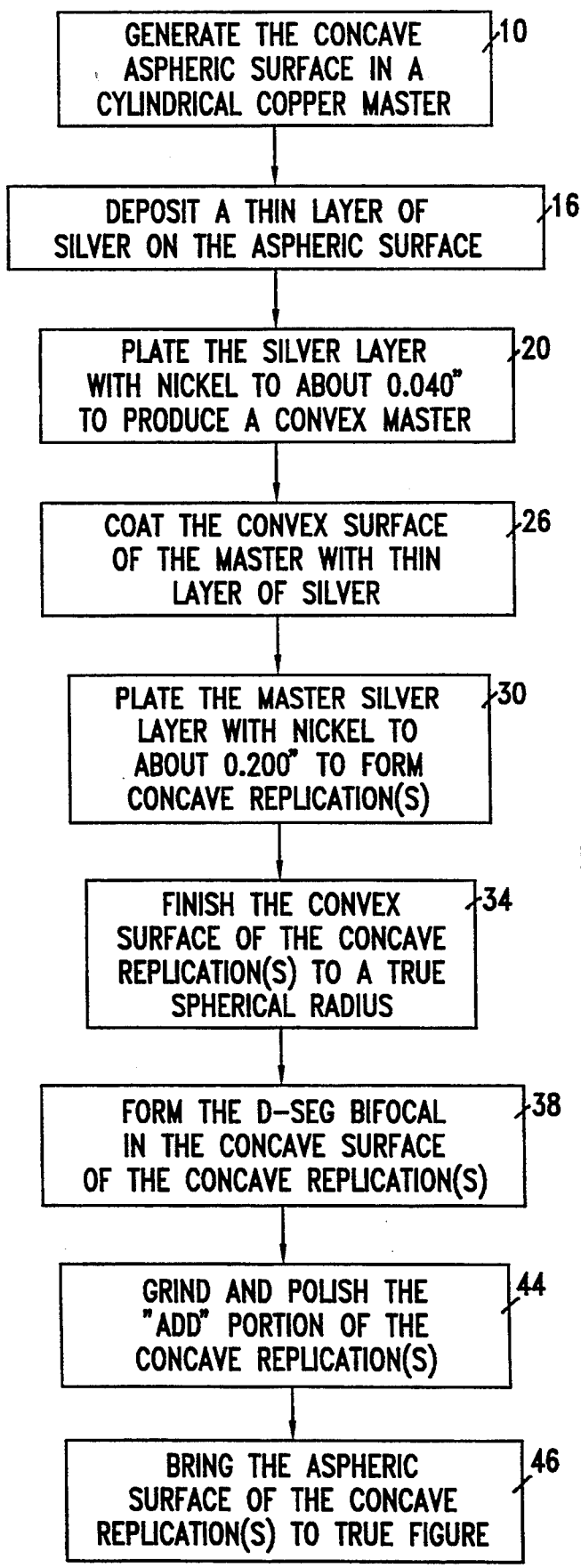
FIG. 1 is a flow diagram illustrating the steps carried out in my process of making aspheric bifocal lens mold inserts.
Figure 2:
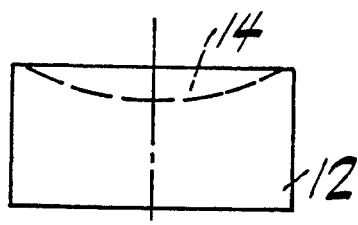
FIG. 2 is an elevation of a substrate used in my method of making aspheric bifocal lens mold inserts.
Figure 3:
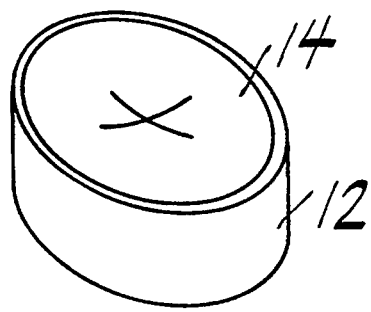
FIG. 3 is a perspective view of the substrate illustrated in FIG. 2.

Referring now to the drawings, the first step in the practice of my method of forming aspheric bifocal lens mold inserts is the generation of the concave aspheric surface in a suitable substrate as indicated by block 10 of FIG. 1. Preferably I employ a cylindrical copper substrate 12 on which the aspheric surface 14 is formed using a single point diamond turning center or lathe of a suitable type known to the art. The resultant substrate is illustrated in FIGS. 2 and 3 of the drawings.

Figure 4:
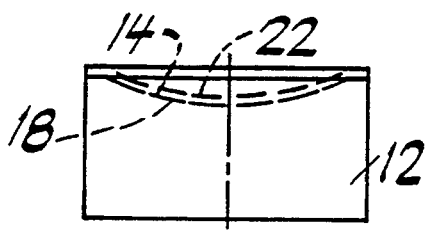
FIG. 4 is an elevation of the substrate of FIG. 2 carrying a deposit of material for forming the convex master in my method of making aspheric bifocal lens mold inserts.

After formation of the surface 14, I next deposit a thin layer 18 of silver thereon, as illustrated by the block 16 in FIG. 1. Any suitable technique, such for example as spraying, may be used to apply the silver coating 18 to the surface 14, as shown in FIG. 4. This coating 18 of silver acts as a release agent for the master to be described hereinbelow.

Figure 5:
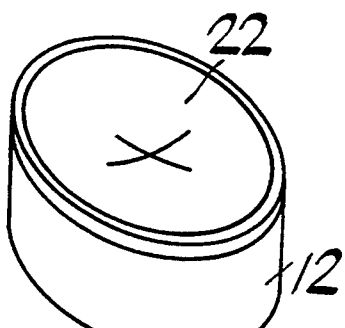
FIG. 5 is a perspective view of the substrate of FIG. 4.

Following the deposition of the thin layer 18 of silver on the aspheric surface 14, I electroplate the silver layer with nickel to about 0.04" as indicated by the block 20 in FIG. 1. The result is a layer 22 of nickel shown in FIGS. 4 and 5 which, upon removal from the substrate 12, forms the master 24 having a convex surface carrying a negative image of the original aspheric curve. In forming the nickel master, any suitable electrolytic deposition process known to the art can be employed.

As an alternative to forming the master from nickel, as in the case of the master 14, it may be made from plastic such as epoxy resin having a hard silicon monoxide layer at its convex surface. This can be done, for example, using a glass master in place of the cylindrical copper master.

Once the convex nickel master 24 has been formed, the replication process is repeated to produce as many concave nickel replicas as are required to cover the particular base curve. As is known in the art, many base curves are employed to cover a range of prescriptions.

Figure 6:
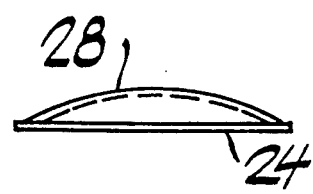
FIG. 6 is an elevation of the convex master formed in the course of my method of making aspheric bifocal lens mold inserts.
Figure 7:
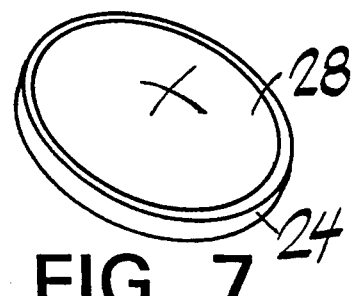
FIG. 7 is a perspective view of the master shown in FIG. 6.

The first step in producing a concave replication is to coat the convex surface of the master 24 with a thin layer 28 of silver as shown in FIGS. 6 and 7. This step is indicated by the block 26 in FIG. 1. Any suitable technique, such for example as spraying, may be used to apply the layer 28 to the master 24.

Figure 8:
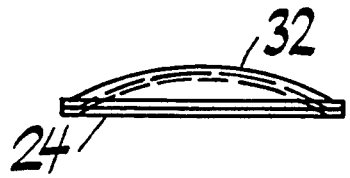
FIG. 8 is an elevation illustrating the formation of the concave replication in my method of making aspheric segmented bifocal lens mold inserts.
Figure 9:
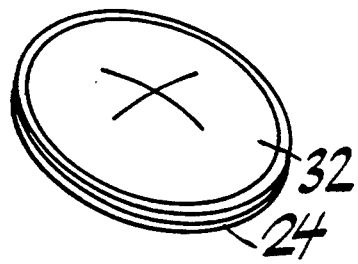
FIG. 9 is a perspective view of the assembly shown in FIG. 8.

As indicated by block 30 in FIG. 1, after the coating 28 has been applied to the master, the silver layer 28 is electroplated with nickel to a thickness of about 0.200" to form a concave replication indicated by the reference character 32 in FIGS. 8 and 9. After the concave replication has thus been formed, it is mechanically separated from the master 24.

Figure 10:
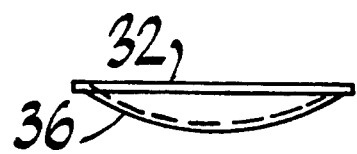
FIG. 10 is an elevation of one of the concave replications formed by my method of making aspheric bifocal lens mold inserts.
Figure 11:
FIG. 11 is an elevation of the replication shown in FIG. 10 following the operation of finishing the convex surface thereof to a true spherical radius.
Figure 12:
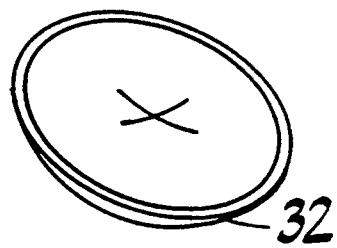
FIG. 12 is a perspective view of the concave replication illustrated in FIG. 11.

From the foregoing, it will be appreciated that the replication 32 is a concave nickel replication which is approximately 0.200" thick and is solid nickel. When fabricating a nickel replication of this thickness, stresses in the plating process cause some loss of curve value on the aspheric piece. For example, the best nickel replication will deviate from proper curve value with a minimum of 0.02 to 0.03 diopters of astigmatism. In order to overcome this problem, as indicated by the block 34 in FIG. 1, the convex surface 36 of the second replication is finished to a true spherical radius to allow for fixturing and nesting in an injection molding unit. This trueing of the surface 36 may be accomplished on any suitable apparatus known to the art. FIG. 10 illustrates the form of the concave replication 32 before trueing of the surface 36. FIGS. 11 and 12 illustrate the form of the replica 32 after trueing of surface 36.

Figure 13:
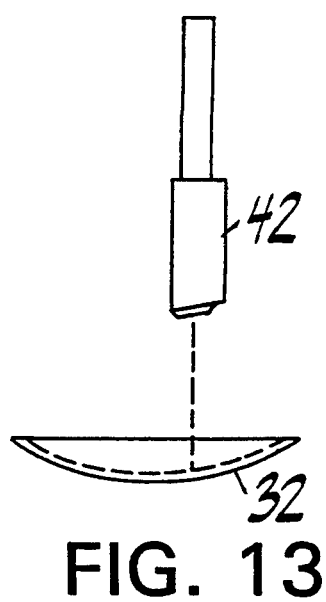
FIG. 13 is an elevation illustrating the formation of the "D-seg" bifocal in the concave surface of one of the concave replications in my method of making aspheric bifocal lens mold inserts.
Figure 15:
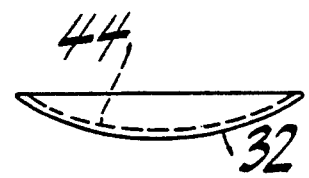
FIG. 15 is an elevation of a finished aspheric bifocal lens mold insert produced by my method of making aspheric bifocal lens mold inserts.
Figure 14:
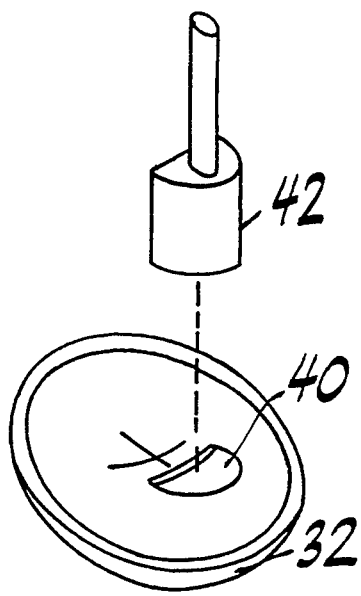
FIG. 14 is a perspective view of the concave replication and apparatus illustrated in FIG. 13.
Figure 16:
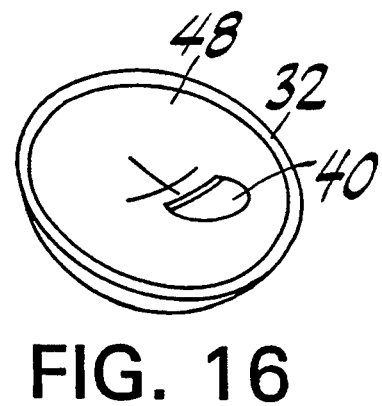
FIG. 16 is a perspective view of the insert illustrated in FIG. 15.

Next, as indicated by block 38, the near vision or reading portion surface is formed in the concave surface of the replication 32. For example, a D-seg bifocal 40 is formed in the concave surface of the replication 32. As shown in FIGS. 13 and 14, this D-seg bifocal 40 is formed by placing the replication 32 in an Electrical Discharge Machine of a type known to the art. As is known, such a machine includes a graphite electrode 42 having the proper D-shape. The electrode is positioned above the concave surface of the second replication 32 normal to the center of the location of the reading portion. The electrode 42 has a convex spherical radius which corresponds to the concave reading area radius to be produced on the aspheric. In operation of the Electrical Discharge Machine the D-seg is burned into the surface of the aspheric. In the practice of my process I enlarge the D-seg to a predetermined size.

After the D-seg has been cut into the concave aspheric surface of the second replication 32, and as indicated by the block 44 in FIG. 1, the D-seg or "add" portion of the second replication 32 is ground and polished. To carry out this step, the replication 32 is mounted on a toric polisher. The D-seg 40 is ground and polished using cast iron laps in conjunction with various grades of alumina oxide and diamond compound. Polishing pad materials also are used in the performance of this step. As indicated by block 46 in FIG. 1, after the "add" portion of the second replication has been ground and polished, the aspheric surface 48 of the second replication 32 is brought to true figure. This is accomplished by mounting the unit into a single point diamond turning center, or lathe. The aspheric curve is then trued at the same time as the D-seg geometry is brought into tolerance by reducing it in size. Finally, if necessary, the aspheric surface 48 is hand polished to remove turning marks left by the single point diamond tool bit. In the course of hand polishing, diamond and alumina oxide compounds are used in conjunction with polishing pads.

It will readily be appreciated that as many concave replications 32 are made as there are D-segs for the base curve represented by the aspheric surface 48. This is achieved by repeating the steps represented by blocks 26, 30, 34, 38, 44 and 46 of FIG. 1 for each concave replication to be produced. As has been pointed out hereinabove, many base curves are employed to cover the range of prescriptions of a lens series. Thus, as many masters 24 are made as there are prescriptions and as many concave replications as there are D-segs for each master.

Figure 18:
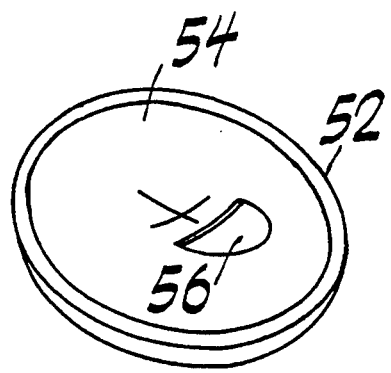
FIG. 18 is a perspective of an element formed in the initial stage of the alternate form of my method.
Figure 17:
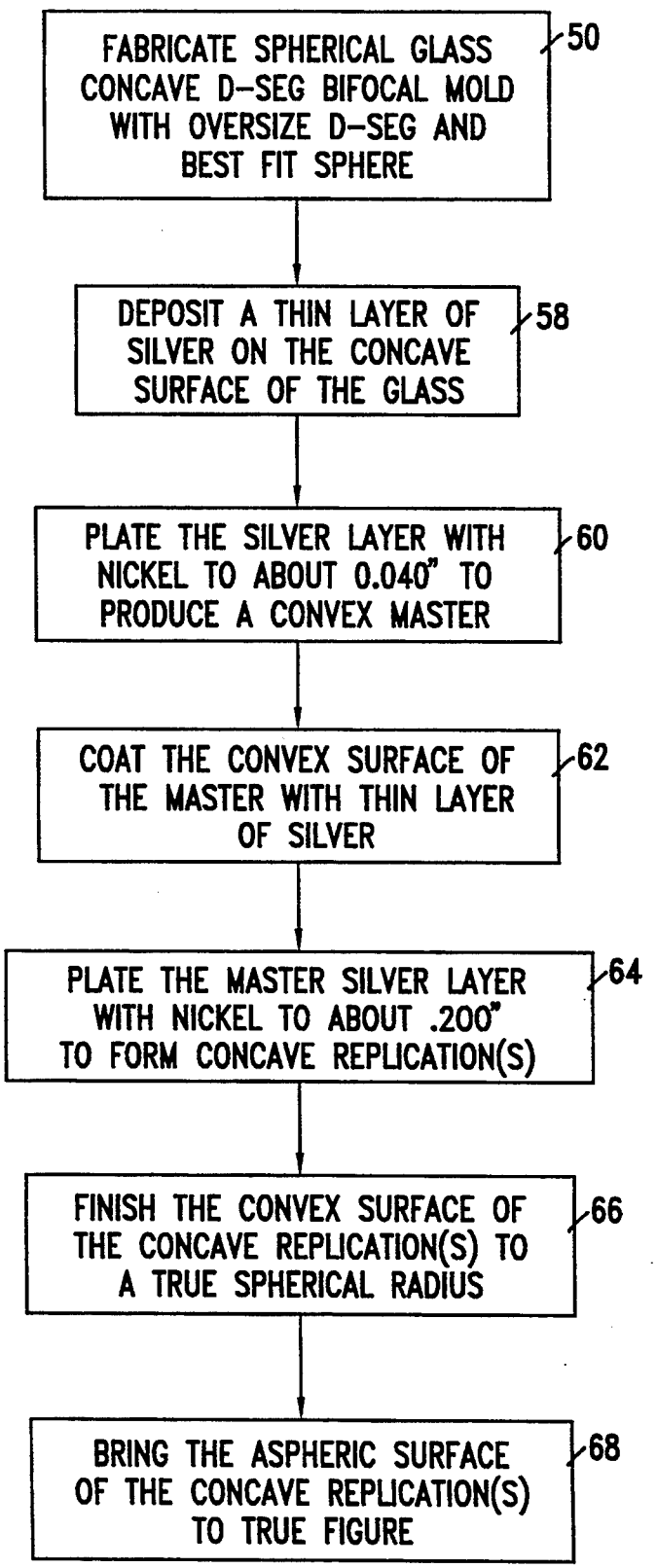
FIG. 17 is a flow diagram illustrating the steps carried out in an alternate form of my method of making aspheric bifocal lens mold inserts.

Referring now to FIGS. 17 and 18, in an alternate form of my method I first fabricate a spherical glass concave D-seg bifocal mold with oversize D-seg and best fit sphere as indicated by block 50 of FIG. 17. The glass master 52 is fabricated with a D-seg bifocal countersink, fused with a button and finished to an oversized diameter with a spherical radius to provide the concave surface 54 and the D-seg 56. The concave surface 54 is formed to be the best fit sphere to the desired aspheric. This fabrication may be achieved by techniques known to the art. Next, as indicated by blocks 58 and 60, silver deposition and nickel plating operations are carried out to produce the convex master. Then, as indicated by blocks 62 and 64, the coating and plating operations are carried out to provide the desired number of replications. Finally, as indicated by block 68, the concave surface of the replications is machined on a single point diamond lathe to the desired aspheric surface. In the course of this machining operation the finished width of the bifocal is brought to final geometry.

It will be appreciated that the alternate method just described eliminates the need for the Electrical Discharge Machine operation of block 38 and the grinding and polishing operations of block 44. The operations represented by blocks 58, 60, 62, 64, 66 and 68 of FIG. 17 are the same as those represented by blocks 16, 20, 26, 30, 34 and 46 of FIG. 1.

It will be seen that I have accomplished the objects of my invention. I have provided a method of making aspheric bifocal lens mold inserts. My method is more cost effective than are other methods. It has a high success rate.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of making an aspheric bifocal mold insert including the steps of
    forming a concave surface in a substrate,
    depositing material over said concave surface to form a master having a convex surface in the form of a negative image of said concave surface,
    separating said master from said substrate,
    depositing material over the convex surface of said master to produce an element having a concave surface which is a replication of the convex surface of said master,
    removing said element from said master,
    forming a spheric near vision surface portion in the concave surface of said element,
    and bringing the concave surface of said element to the desired aspheric configuration.

2. A method as in claim 1 in which the step of forming said spheric near vision surface portion comprises forming a spheric near vision surface portion in a substrate having a concave spherical surface which is the best fit to the desired aspheric surface configuration.

3. A method as in claim 1 in which said step of forming said spheric near vision surface portion is performed after said element is removed from said master.

4. A method of making a plurality of concave aspheric bifocal mold inserts, each having the same base curve and a spherical D-seg of a different radius including the steps of
    forming a concave surface in a substrate,
    depositing material over said concave surface to form a master having a convex surface in the form of a negative image of said concave surface,
    separating said master from said substrate,
    depositing material over the convex surface of said master to produce an element having a concave surface which is a replication of the convex surface of said master,
    repeating said second depositing step a number of times to produce a number of said elements,
    forming respective spheric near vision surface portions of different radii in the concave surfaces of said elements, and
    bringing the concave surfaces of said elements to the desired aspheric configuration.

5. A method as in claim 4 in which the step of forming respective near vision surface portions of different radii in the concave surfaces of said elements comprises forming said near vision surface portions in respective substrates each having a concave spherical surface which is the best fit to the desired aspheric surface configuration before said first depositing step whereby said first depositing step results in a plurality of masters.

6. A method as in claim 4 in which said step of forming said spheric near vision surface portion is performed after said second depositing step.

7. A method of making an aspheric bifocal mold insert including the steps of
    forming an aspheric concave surface in a substrate,
    depositing material over said concave surface to form a master having a convex surface in the form of a negative image of said aspheric surface,
    separating said master from said substrate,
    depositing material over the convex surface of said master to produce an element having a concave surface which is a replication of said aspheric surface and
    forming a spheric near vision surface portion in the aspheric surface of said element.

8. A method as in claim 7 in which said element has a convex surface opposite said concave surface, said method including the step of trueing said element convex surface to spherical form before forming said near vision surface portion.

9. A method as in claim 7 in which said near vision surface portion is a D-seg bifocal formed to somewhat greater than final size, said method including the step of trueing said element aspheric surface after formation of said D-seg bifocal, said aspheric surface trueing step bringing said D-seg bifocal down to its final size.

10. A method as in claim 8 in which said near vision surface portion is a D-seg bifocal formed to somewhat greater than final size, said method including the step of trueing said element aspheric surface after formation of said D-seg bifocal, said aspheric surface trueing step bringing said D-seg bifocal down to its final size.

11. A method of making an aspheric bifocal mold insert including the steps of
    forming an aspheric concave surface in a conductive substrate,
    electrolytically depositing a layer of metal over said aspheric surface to form a master having a convex surface in the form of a negative image of said aspheric surface,
    separating said master from said substrate,
    electrolytically depositing a layer of metal over the convex surface of said master to form an element having a concave replication of said aspheric surface on one side thereof and a convex surface on the opposite side thereof,
    bringing the convex surface of said element to true spherical form and
    forming a spherical reading surface portion in said concave replication.

12. A method as in claim 11 in which said near vision surface portion is a D-seg bifocal formed to somewhat greater than final size, said method including the step of trueing said element aspheric surface after formation of said D-seg bifocal, said aspheric surface trueing step bringing said D-seg bifocal down to its final size.

13. A method as in claim 12 in which said metal is nickel.

14. A method as in claim 12 including the steps of plating the surface to be plated with a release agent before each of said electroplating steps.

15. A method as in claim 14 in which said release agent is silver.

16. A method of making an aspheric bifocal mold insert including the steps of
    fabricating a spherical glass concave D-seg mold with a spherical surface having the best fit to the desired aspheric surface,
    depositing a thin layer of silver on the concave glass surface, plating the silver layer with nickel to produce a convex master, coating the convex surface of the master with a thin layer of silver, plating the master silver layer with nickel to form a replication, and bringing the concave surface of the replication to the desired aspheric configuration.

17. A method as in claim 16 including the step of finishing the convex surface of the replication to a true spherical radius prior to bringing the concave surface of the replication to the desired aspheric configuration.

* * * * *